Oct. 24, 1933.   H. THOMA   1,931,969
HYDRAULIC GEAR
Filed June 30, 1931
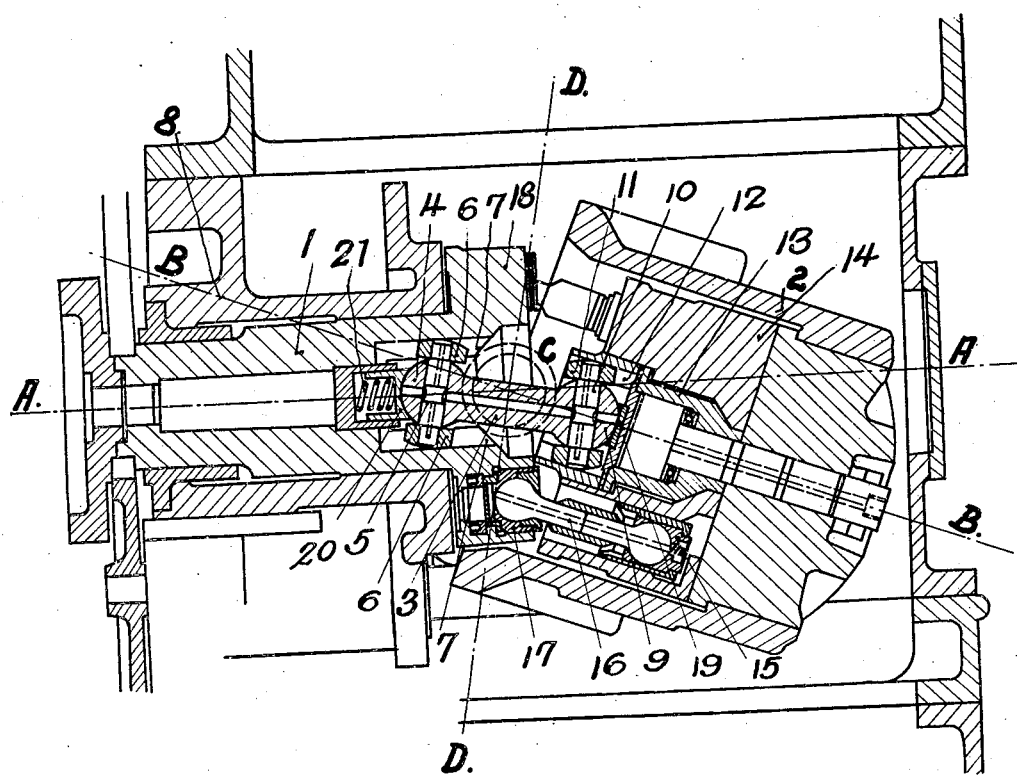
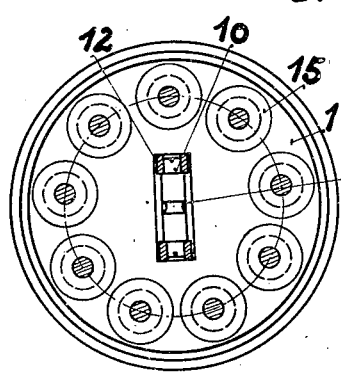
Fig. 2
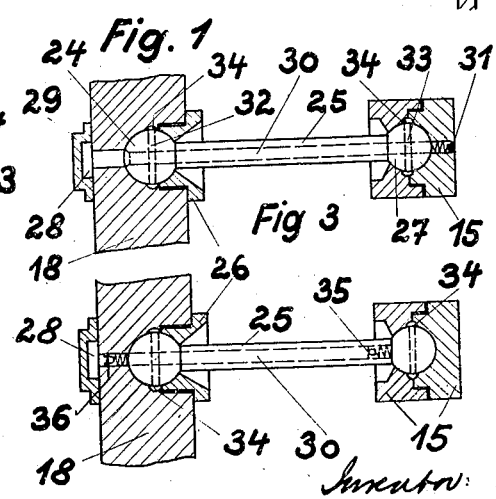
Inventor:
Hans Thoma,
by Franks. Anneeman, Atty.

Patented Oct. 24, 1933

1,931,969

UNITED STATES PATENT OFFICE 1,931,969

HYDRAULIC GEAR

Hans Thoma, Karlsruhe, Germany

Application June 30, 1931, Serial No. 548,049, and in Germany November 15, 1929

4 Claims. (Cl. 64—91)

Applications have been filed in Germany Nov. 15, 1929 and July 15, 1930.

Constructional types of hydraulic gears are known, in which the substantially or absolutely parallel, axially arranged cylinders act with corresponding connecting rods on a ring, which ring and cylinders are mutually displaced, in order to change the delivered quantity or the efficiency of the gear part in question. Either the ring or the cylinder block may be rigidly mounted, whereas the other part is oscillatable so that therefore the longitudinal axes of the two parts form a variable angle.

Cardan joints have been used for the connection of the two parts for the movement transmission. It has however been found, that the ordinary Cardan joints give an irregular movement transmission. Consequently the turning moment is also transmitted irregularly on to the shaft so that the employment of such a gearing offers difficulties in cases where a uniform turning moment is important, that is for example when driving machine tools.

It has been proposed to compensate for this irregular movement transmission by employing cylinders with bores of different diameters but a satisfactory result has not been obtained, quite apart from the fact that the different diameters of the bores considerably add to the cost of production of the gearing.

According to the invention a uniform movement transmission, that is a uniform turning moment, is attained in that not an ordinary Cardan joint, but a double Cardan joint is employed and this is so arranged that in all the mutual positions of the two parts of the gearing, that is therefore at all angles coming into question between the stationary and oscillatable axes the movement transmission is uniform.

An embodiment of the invention is illustrated by way of example in the accompanying drawing in which:—

Fig. 1 shows a liquid gearing in longitudinal section.

Fig. 2 is a cross section through the Cardan connection rod, the cylinder arrangement being shown in elevation.

Fig. 3 is a longitudinal section through the Cardan body showing one construction of lubrication.

Fig. 4 is a similar view to Fig. 3 showing a modified lubricating arrangement.

The axis A—A of the stationary shaft 1 and the axis B—B of the oscillatable cylinder part 2 form an angle, the point of intersection C of which lies in the middle between the pivot point around which the cylinder part is oscillatable. The bisecting line D—D of the angle A—C—B is therefore oscillated with the oscillation of the cylinder block and it is therefore necessary for the longitudinal axis of the Cardan body 3 to be perpendicular to the axis D—D in any position of the cylinder part. Only then will the movement transmission be uniform.

The Cardan body 3 carries a Cardan joint on each end. The one joint consists of a ball pivot 4, in which a bolt or axle 5 is mounted, which carries the slide blocks 6, sliding on the paths or grooves 7, provided in the head end of the shaft 1. The shaft 1 is journaled in a casing 8 of the hydraulic gearing. On the other end of the Cardan body a second ball pivot 9 is mounted in which the bolt or axle 10 is arranged carrying the slide blocks 11. These blocks run on the paths or grooves 12 of the insert 13 in the cylinder block 14. The pistons 15 move in the cylinder block and are connected by ball rods 16 to the cups 17, fitted in the flange 18 of the shaft 1.

In order to guide the Cardan body in axial direction, the ball heads must bear against ball cups or segmento-spherical seats, which are arranged either rigid or resilient. The ball cup 19 is for example fixed on the cylinder side, whereas the ball cup 20 on the shaft side is acted upon by the pressure of a spring 21 and can consequently yield in the longitudinal direction of the shaft A—A. In this manner the Cardan rod is guided yieldably and a pressure can be exerted on the cylinders.

The Cardan rod is bored, in order, if necessary, to supply lubricant from the shaft to the cylinder bearing or inversely.

With this construction a uniform transmission of the turning moment is ensured in any position of the cylinder body relative to the shaft 1, the condition being that the Cardan joint is arranged symmetrically to the angle-bisecting line D—D.

The Cardan rod may however be entirely omitted and the two Cardan joints united to a double Cardan joint in the point of intersection C of the axes.

The Cardan joints may also be employed for gearings with continuous shaft, in which case the Cardan body must only be made tubular so that the shaft passes through the interior of the Cardan body.

In the form of construction illustrated in the drawing the idea was to construct the secondary part (motor) of a hydraulic gearing in which therefore pressure oil is fed to the cylinders, the rotation being transmitted upon the shaft 2 by circulation of the cylinder block 14.

However, the construction of the symmetrical Cardan joint may be also employed for the primary part (pump) of a hydraulic gearing, whereby irregularities in the supply of the oil current are avoided, such as occur with ordinary Cardan joints. A uniform oil flow is important in order to prevent variations in speed of the secondary part and therefore irregularities of the driving.

The cylinder block may evidently be mounted rigidly, the shaft being then arranged oscillatably.

The construction of the lubrication for the ball pins of the Cardan joints and of the piston rods is a very important point.

Figs. 3 and 4 show two forms of construction of this lubrication. It is very important in this lubrication of the ball joints to prevent knocking, which is caused by the play of the balls in their joints, especially in the case of unequal wear of the balls in the cups, and by which the pressure stresses and relievings occurring periodically in the rotating pistons are produced.

According to the invention these disadvantages are overcome in that the oil under pressure of sufficiently high tension generally speaking the pressure oil from the pressure side of the gearing, is introduced into the lubricating channels of the ball rod system, before the balls of the rods are pressed on to their seat under the load of the piston. Therefore, if pressure oil is introduced in sufficiently large quantities between the ball and the cup at the instant of relieving, or when tensional stresses occur, this oil offers a certain resistance to the contacting of the elements during the subsequently occurring pressure stressing by the loading of the piston, so that a kind of braking effect occurs, by which shocks are avoided and the gearing runs smoothly.

Under all circumstances sufficient time must be allowed for the oil flowing to the surfaces to be lubricated, as it is a question of the flowing of viscous liquids into spaces of small dimensions. The lubricating channels may be at the same time permanently maintained under pressure, so that the entire period occupied by a suction stroke is available for the penetration of the pressure oil into the unloaded ball rod system.

However, in order to prevent losses of oil due to leakages in the continually open lubricating oil channels, a check valve is arranged at a suitable point, for example at the point where the oil passes from the piston into the cylinder space, so that a flowing off of the lubricating oil is prevented in case a lower pressure exists in the cylinder space than in the pressure lubrication itself.

Fig. 3 shows such a form of construction.

The ball 24 of the piston rod 25 rests in the flange 18 and is held by a nut 26. The other ball 27 rests in the piston 15. The feed of the lubricating oil is effected from the annular space 28 through the bore 29. The piston rod 25 is provided with a bore 30. A check valve 31 is provided in the piston 15. By this arrangement the pressure oil passes at the relieving between the ball surfaces, and a lubrication takes place before the pressure in the gear part presses the surfaces together. In order to also lubricate the side surfaces of the balls at the same time, transverse channels 32 and 33 are arranged in the balls and supply oil to the equatorially arranged annular spaces 34. Thus a lubrication of the return surfaces is rendered possible under pressure.

If the ball in the piston 15 is smaller than that in the driving flange 18, a check valve 35 (Fig. 4) may also be provided in the piston rod between two lubricating points. Thus the back flowing of the oil from the smaller to the larger ball surface is prevented. The check valve 36 may also be provided on the feed side for the lubricating oil.

I claim:—

1. An arrangement for oil-gears of the type including pumps and motors and having a cylinder block oscillatable with respect to a disk, including a revoluble driving member having a recess in its end provided with oppositely positioned guide slots extending longitudinally of the recess, a revoluble driven member also having a recess in its end provided with oppositely positioned guide grooves extending longitudinally of the recess, a Cardan link having ball ends each mounted in a respective recess, axles each extending transversely through a respective ball end, and shoes mounted on the ends of the axles and engaging in respective guide grooves, said Cardan link having an oil passage extending axially therethrough and the axles being provided with oil grooves extending circumferentially around the respective axles in registry with said oil passage.

2. An arrangement for oil-gears of the type including pumps and motors and having a cylinder block oscillatable with respect to a disk, including a revoluble driving member having a recess in its end provided with oppositely positioned guide slots extending longitudinally of the recess, a revoluble driven member also having a recess in its end provided with oppositely positioned guide grooves extending longitudinally of the recess, a Cardan link having ball ends each mounted in a respective recess, axles each extending transversely through a respective ball end, shoes mounted on the ends of the axles and engaging in respective guide grooves, said Cardan link having an oil passage extending axially therethrough and the axles being provided with oil grooves extending circumferentially around the respective axles in registry with said oil passage, a segmento-spherical seat for one of said ball ends fixed in one of said recesses, a second segmento-spherical seat for the remaining ball end mounted in the remaining recess and movable longitudinally thereof, and a spring urging the last mentioned seat into engagement with its ball end.

3. An arrangement for oil-gears of the type including pumps and motors and having a cylinder block oscillatable with respect to a disk, including a revoluble driving member having a recess in its end provided with oppositely positioned guide slots extending longitudinally of the recess, a revoluble driven member also having a recess in its end provided with oppositely positioned guide grooves extending longitudinally of the recess, a Cardan link having ball ends each mounted in a respective recess, axles each extending transversely through a respective ball end, shoes mounted on the ends of the axles and engaging in respective guide grooves, said Cardan link having an oil passage extending axially therethrough and the axles being provided with oil grooves extending circumferentially around the respective axles in registry with said oil passage, and seats in said driving and driven members engaging the ends of the Cardan link and closing the oil passage therethrough.

4. An arrangement for oil-gears of the type including pumps and motors and having a cylinder block oscillatable with respect to a disk, including a revoluble driving member having a recess in its end provided with oppositely positioned guide slots extending longitudinally of the recess, a revoluble driven member also having a recess in its end provided with oppositely positioned guide grooves extending longitudinally of the recess, a Cardan link having ball ends each mounted in a respective recess, axles each extending transversely through a respective ball end, shoes mounted on the ends of the axles and engaging in respective guide grooves, said Cardan link having an oil passage extending axially therethrough and the axles being provided with oil grooves extending circumferentially around the respective axles in registry with said oil passage, a segmento-spherical seat for one of said ball ends fixed in one of said recesses, a second segmento-spherical seat for the remaining ball end mounted in the remaining recess and movable longitudinally thereof, and a spring urging the last mentioned seat into engagement with its ball end, said seats forming closures for the oil passage of the Cardan link.

HANS THOMA.